United States Patent Office 3,489,648
Patented Jan. 13, 1970

3,489,648
MICROBIAL HYDROCARBON CONSUMPTION
Eugene H. Wegner, Bartlesville, Okla., assignor to Phillips Petroleum Company, a corporation of Delaware
No Drawing. Filed Dec. 22, 1966, Ser. No. 603,715
Int. Cl. C12c 11/00; C12b 1/20; C12d 13/06
U.S. Cl. 195—28                                    10 Claims

ABSTRACT OF THE DISCLOSURE

Normal paraffins are contacted with yeast in a first fermentation zone wherein a substantial amount of the n-paraffin is converted to a more desirable high protein material and the hydrocarbon effluent from the first fermentation zone comprising, at least in part, n-paraffin not having been converted is passed to a second fermentation zone wherein it is contacted with bacteria to consume at least a portion of the unconverted paraffin.

---

In one aspect n-paraffins and hydrocarbon mixtures thereof are contacted in two stages with microorganisms. In another aspect hydrocarbons comprising, in part, n-paraffins are serially contacted in two fermentation zones with yeast and bacteria. In another aspect n-paraffins are consumed by yeast in a first fermentation zone and unconverted n-paraffins are further consumed in the presence of bacteria in a second fermentation zone. In another aspect preferred protein material is produced by enzymatic conversion of n-paraffins in a first fermentation zone in the presence of yeast and unconverted n-paraffins are further consumed in a second fermentation zone by active bacteria.

Yeast and bacteria being acclimated to the conversion of hydrocarbons are known to be effective agents for the removal of paraffinic hydrocarbons, particularly n-paraffins from mixtures thereof with numerous other species of hydrocarbons. It is also known that certain cultures produced by the enzymatic conversion of hydrocarbons have considerable nutrient value. Therefore, in applications requiring the removal of n-paraffin hydrocarbon from hydrocarbon mixtures thereof, it is desirable to recover at least part of the protein-rich culture produced by the enzymatic conversion of paraffins. I have found, however, that these two objects cannot be most effectively accomplished by procedures known in the art.

It is therefore one object of this invention to provide an improved method for removing paraffins from hydrocarbon mixtures thereof. It is another object of this invention to provide an improved method for increasing the ultimate degree of paraffin removal from hydrocarbon mixtures thereof. It is another object of this invention to provide a method for producing desirable nutrient material without sacrificing efficiency of ultimate conversion. It is another object of this invention to provide a method for increasing the ultimate degree of consumption of hydrocarbon feedstocks.

In accordance with one embodiment of this invention, hydrocarbons containing, at least in part, n-paraffins are contacted with yeast in a first fermentation zone to consume a substantial portion of n-paraffin, the unconverted paraffin being contacted in a second fermentation zone with or without intermediate separation with bacteria to further consume said unconverted paraffin.

High conversions are obtained through the use of this two-step procedure due to the fact that partially converted hydrocarbon, i.e., hydrocarbon feed having the n-paraffin content thereof substantially reduced in the first stage, is further reacted in a second stage whereby it is not diluted with fresh hydrocarbon feed being passed to the first fermentation zone having a substantially higher concentration of n-paraffins.

I have also found that the protein product derived by the consumption of n-paraffins by yeast is more desirable than that produced by the consumption of similar hydrocarbon feedstocks with bacteria. However, certain species and strains of bacteria are more effective for consuming n-paraffins, particularly where paraffin concentration is relatively low.

In accordance with these observations I have devised an enzymatic conversion process employing two serial stages or fermentation zones and both yeast and bacteria. Therefore, in accordance with another embodiment of this invention, a hydrocarbon feed comprising, at least in part, n-paraffin is contacted with yeast in a first fermentation zone wherein a substantial amount of the n-paraffin is converted to a more desirable high protein material and the hydrocarbon effluent from the first fermentation zone comprising, at least in part, n-paraffin not having been converted is passed to a second fermentation zone wherein it is contacted with bacteria to consume at least a portion of the unconverted paraffin.

In this embodiment a desirable, or more preferable, protein product is produced in the first fermentation zone wherein yeast is employed as the microbial agent while ultimate conversions in excess of that which could be achieved by the use of yeast in two series fermentation zones is obtained by contacting unconverted paraffin in the effluent from the first fermentation zone with bacteria in the second fermentation zone.

The concept of this invention can also be accomplished by employing more than two fermentation zones, for example, three or four serially operated fermentation zones, wherein even higher conversions might be obtained.

Essentially any hydrocarbon can be treated by the process of this invention. However, as it is usually preferred that the reaction phase consist of a hydrocarbon-water emulsion, it is, of course, preferred that the hydrocarbon be substantially fluid at reactant conditions in order to facilitate such dispersion. It is therefore presently preferred that the hydrocarbons treated have from about 6 to about 40 carbon atoms and that the n-paraffins contained in the hydrocarbon feed have from about 10 to about 25 carbon atoms. Broader ranges of molecular weight can, of course, be employed, although better economy is realized within these preferred ranges. Essentially all types of hydrocarbon mixtures comprising n-paraffin and/or branched and unbranched aliphatic, cycloaliphatic and aromatic hydrocarbons can be employed.

The n-paraffin in the hydrocarbon feed, regardless of relative concentration, will be converted, at least in some degree, by the process of this invention. However, where the production of high quality protein feed supplement is desired, it is preferable to use relatively concentrated n-paraffins having therein essentially no other hydrocarbons or only minor amounts thereof.

Essentially any microorganisms capable of consuming n-paraffins are applicable within the concept of this invention, which is directed to a process of facilitating such conversions rather than to the use of any particular microbial agent. Exemplary of cultures that can be employed or can be the Candida species yeast, such as for example, Candida lipolytica, Candida utilus, Candida pulcherrima, and bacteria such as Pseudomonas species, Micrococcus species, Corynebacterium species, Nocardia species, Brevibacterium species, Flavobacterium species, such as for example, Pseudomonas aeruginosa, Micrococcus cerificans, Corynebacterium michiganense, Nocardia erythropolis, Brevibacterium lipolyticum, and Flavobacterium resinovarum.

Essentially any operating conditions under which the microorganism selected is capable of consuming n-paraffins can be employed. For example, in the presently preferred two-stage operation, the first fermentation zone temperature is preferably within the range of from about 25 to about 45° C. with a contact time of from about 3.5 to about 10 hours. Preferred operating temperatures in the second fermentation zone are the same, and contact time is preferably within the range of from about 1 to about 10 hours. However, it should be recognized that these conditions are subject to considerable variation depending upon the particular species of microorganism employed and the degree of conversions desired as well as hydrocarbon feed composition. Somewhat reduced contact times are preferred for the more active bacteria such as from about 1.5 to about 8 hours in the first stage and from about 1 to about 8 hours in the second stage. Presently preferred conditions are those at which maximum growth rate is achieved such as temperature within the range of 28–32° C. and a pH within 5 to 8.5 for bacteria and 4.0 to 6.0 for yeast.

The degree of conversion realized will, of course, depend upon the concentration of microorganism in each fermentation zone as well as the concentration of n-paraffin in each instance. It should be realized, however, that these factors are only matters of degree and that some conversion will result, regardless of the relative concentration of microorganism and n-paraffin. However, for the most economical operation, it is presently preferred that the concentration of microorganisms be within the range of from about 1 weight percent to about 3.5 weight percent in the first fermentation zone and from about 1.5 weight percent to about 4.0 weight percent in the second fermentation zone. The relative proportions of hydrocarbon-water phase can also vary considerably, although it is presently preferred that the weight ratio of hydrocarbon to water be within the range of from about 2:100 to about 20:100.

The reaction phase also comprises sources of oxygen and nitrogen capable of supplying these necessary elements to the microorganisms. The most convenient oxygen source is, of course, air, which can be passed upwardly through the reaction phase to accomplish the dual purpose of supplying oxygen and providing agitation. Presently preferred nitrogen sources are ammonium hydroxide, readily decomposable ammonia salts, such as for example, ammonium phosphate, ureas, etc. Ammonium hydroxide is, of course, the most convenient of these materials as it can be formed in situ by passing ammonia gas upwardly through the reaction phase either alone or along with the oxygen-containing gas above-described.

These nitrogen sources are presently preferred for the reason that they not only provide the necessary nitrogen for the microorganisms, but also facilitate control of the reaction phase pH which should be either neutral or acidic, such as for example, within the range of from about 3 to about 8.5. It is presently preferred, however, when yeasts are employed to operate within a pH range of from about 4.0 to about 6.0 for the reason that better conversion and more desirable protein product are produced at these conditions. This pH level can be maintained by controlling the rate of addition of nitrogen source, such as ammonia, ammonium salt, etc, or other basic materials such as potassium hydroxide, sodium hydroxide, etc. The amounts of nitrogen and oxygen added to the system and the rates of such addition will, of course, depend upon the total amount of microbial material present and the rate of growth of the selected microorganisms. The rate of aeration will usually be within the range of from about 0.5 to about 2.0 parts per culture per minute and the addition rate of usable nitrogen will generally be within the range of from about 0.2 to about 0.6 parts per per thousand parts culture per hour.

The microorganisms to be employed as inoculant material in each of the several stages may be prepared in situ before conversion of n-paraffin is initiated. However, it is presently preferred to prepare these inoculant materials in a fermentation vessel isolated from the hydrocarbon fermentation zones. In either event, the desired microorganism can be prepared by adding the desired yeast or bacteria to a reaction medium comprising a n-paraffin similar to the n-paraffins to be converted and maintained as suitable conditions of temperature, pH, and nutrient concentration until the desired amount of acclimated microorganism is obtained.

The growth phase (per liter) usually comprises from about 30 to about 50 grams n-paraffin having from about 10 to about 25 carbon atoms per liter of water, from about 2 to about 4 grams of ammonia or an equivalent amount of comparable nitrogen compounds to supply nitrogen and sufficient added nutrient to maintain the microorganism during this preliminary growth stage. This medium must supply nitrogen in the form capable of consumption by the microorganism usually in the form of ammonium or nitrate ions or urea; phosphorus preferably in the form of phosphate ions; potassium or sodium ions, for example, in the form of chlorides, sulfates, phosphates, etc.; magnesium ions, for example, in the form of magnesium sulfates or chlorides, etc.; and sulfurs usually in the form of sulfate ions. Trace amounts of other constituents are also desirable, such as for example the cupric, iodide, ferric, manganese, molybdate, zinc, and borate ions. In addition, yeasts usually require an additional source of biofactors such as yeast extract which is present in amounts of from about 0.01 to about 10 grams per liter of aqueous medium. However, the requirement for such biofactor can often be served equally well by numerous vitamins such as thiamine, biotin, niacin, riboflavin, pyridoxine, p-aminobenzoic acid, ca-pantothenate, folic acid, either singly or in combination.

In operation the effluent from the first fermentation zone can, if desired, be separated by methods well known in the art, such as filtration or centrifugation. Solvent extraction with numerous solvents such as low molecular weight hydrocarbons and water miscible solvents such as low molecular weight alcohol, can be used for purification. Of course, where all the microorganisms are removed, additional inoculant material must be added continuously to the second fermentation zone along with the hydrocarbon medium effluent from the first fermentor. The most convenient source for the culture feed to the second fermentation zone is, of course, the second stage growth product found in the effluent from the second fermentor. This enzymatically active material can be removed from the effluent of the second stage by the same methods as those described for the intermediate separation following the first fermentation zone. However, it should be understood that in each instance where it is desirable to maintain enzymatically active microorganisms, that separation condition should not be so severe so as to damage cell structure or remove necessary cell lipides. Such separation procedures are described in detail in my co-pending application, Ser. No. 549,472, filed May 12, 1966.

Where the quality of protein product produced in the first fermentation zone is of importance in the overall economics of the process and the second fermentation step is conducted in the presence of bacteria, the intermediate separation above-referred to may be most desirable in order to avoid contamination of the preferred protein supplement with the less desirable products produced in the second stage. However, advantage in ultimate conversion is achieved by passing the entire effluent from the first stage to the second stage in such operations in that the concentration of active microorganisms in the second stage, i.e., yeast and bacteria, is therefore increased.

In another embodiment of this invention where yeast is employed as the active microorganism in each stage, no intermediate separation is necessary and the microorganisms present in the effluent are quite effectively employed as inoculant material for the second fermentation zone. However, it may be desirable to recover at least part of the microorganisms produced in each stage before passage of the hydrocarbon effluent to the next fermentation zone; in which event, the intermediate separation above-described can be employed. In either event, a part of the growth product removed from the effluents of the several fermentors can be recycled to the same fermentation zone as inoculant material. However, this is usually not necessary, for growth of the microorganisms is usually rapid enough to supply all the microorganisms needed. It can be seen, therefore, that once the conversion is in progress, it is not necessary to provide active microorganisms as inoculant material from external sources.

N-paraffin utilization of up to 99.5 percent can be achieved by the process of this invention as compared to ultimate utilization of about 90 percent obtained under the same conditions in single stage operation. N-paraffin utilization of a first fermentation zone will usually be within the range of from about 70 to about 90 percent as compared to ultimate utilization of from about 99 to about 100 percent in the second stage fermentor.

EXAMPLE I

An aqueous mixture containing 3.89 weight percent $C_{12}$ to $C_{15}$ n-paraffins was continuously passed to a first stage fermentor having a holding time of 6 hours. The first stage was operated at a temperature of 30° C. and a pH of 5.0. Air was passed into the reaction phase at a rate of 1.5 volumes per volume per minute. Ammonia was added as necessary to control pH, about 0.5 part per 1000 parts per hour on a weight basis. Agitation was supplied by an impeller turning at 1000 r.p.m. The first stage effluent containing 3.03 weight percent yeast and 0.64 weight percent n-paraffin (83.5 percent first stage utilization with a yield of 93.2 percent based on n-paraffins consumed). This effluent was fed directly to a second stage fermentor having a holding time of two hours, a temperature of 30° C. and a pH of 5.0. The second stage effluent contained 3.59 weight percent yeast and 0.2 weight percent n-paraffin representing an ultimate utilization of 99.5 percent of the n-paraffin and an ultimate yield of 92.8 percent (based on grams yeast produced/grams n-paraffin utilized).

EXAMPLE II

The feed to the first fermentation zone of Example I was passed continuously to a single stage fermentor having a holding time of 8 hours and operated at conditions identical to those of the fermentation zones of Example I. The effluent contained 3.2 weight percent yeast and 0.4 weight percent n-paraffin representing 90 percent n-paraffin utilization.

EXAMPLE III

The effluent from the first fermentation zone of Example I was centrifuged to remove essentially all of the yeast contained therein and the filtrate was passed to a second fermentation zone under conditions identical to those of the second stage of Example I wherein the filtrate was contacted with bacteria species. The effluent from the second fermentation zone contained 0.05 weight percent n-paraffins, 0.63 weight percent bacteria representing a second stage n-paraffin utilization of 99.2 percent and an overall yield of 100 percent based on n-paraffins consumed.

EXAMPLE IV

The feed to the first stage fermentation zone of Example I contained 12 weight percent of a waxy diesel fuel rather than pure n-paraffins. The pour point of this fuel was 35° F. and it contained 20.9% n-paraffins. Operating conditions were essentially the same as in Example I. The first stage effluent which was fed directly to the second stage contained 2.3 weight percent yeast, and the diesel fuel pour point was reduced to 10° F. and the n-paraffin content to 7.8 weight percent. The effluent from the second stage contained 2.7 weight percent yeast and the diesel oil pour point was reduced to below −60° F. and the n-paraffin content to 2.6 weight percent.

I claim:
1. A method for treating hydrocarbons comprising n-paraffin which comprises contacting said hydrocarbon in a first fermentation zone with a yeast culture capable of consuming said paraffin at conditions sufficient to consume a substantial portion of said paraffin and contacting at least the hydrocarbon effluent from said first zone comprising unconverted paraffin in a second fermentation zone with bacteria culture capable of consuming said n-paraffin at conditions sufficient to consume at least a portion of said unconverted n-paraffin, said first and second zones having therein sources of oxygen and nitrogen capable of supplying said culture with oxygen and nitrogen.

2. The method of claim 1 wherein said hydrocarbon is a mixture of at least two hydrocarbons having from about 6 to about 40 carbon atoms and wherein at least one of said hydrocarbons is a n-paraffin having from about 10 to about 25 carbon atoms.

3. The method of claim 1 wherein said yeast is selected from the group consisting of *Candida lipolytica, Canadida pulcherrima* or *Candida utilus*, and wherein said bacteria is selected from the group consisting of *Pseudomonas aeruginosa, Micrococcus cerificans, Corynebacterium michiganense, Nocardia erythropolis, Brevibacterium lipolyticum* and *Flavobacterium resinovarum*.

4. The method of claim 3 wherein said hydrocarbon is contacted with said yeast in said first zone at a temperature of from about 25 to about 45° C. for a period of from about 3.5 to about 10 hours and said unconverted n-paraffin is contacted with said culture in said second zone at a temperature of from about 25 to about 45° C. for a period of from about 1 to about 10 hours.

5. The method of claim 1 wherein said hydrocarbon is contacted with said yeast in said first zone in the presence of ammonia and oxygen.

6. The method of claim 1 wherein the reaction phase in said first and second zones further comprises water and wherein the concentration of said culture is within the range of from about 1 to about 3.5 weight percent and the concentration of said hydrocarbon is within the range of from about 2 to about 20 weight percent based on total reaction mixture.

7. The method of claim 1 wherein said oxygen source is air, said nitrogen source is a nitrogen-containing compound capable of furnishing nitrogen to said culture and the pH of said reaction phase in each of said zones is within the range of from about 4.0 to about 6.0.

8. The method of claim 1 wherein at least part of said culture in said second zone is recovered from the effluent therefrom and at least part of the thus recovered culture is returned to at least one of said first and second zones.

9. The method of claim 1 wherein at least a portion of said yeast culture is recovered from the effluent of said first zone and at least part of the thus recovered culture is returned to said first zone.

10. The method of claim 1 wherein the yeast culture is grown in the presence of a nutrient medium containing a biofactor selected from yeast extract and vitamins.

References Cited

UNITED STATES PATENTS

| 3,193,390 | 7/1965 | Champagnat et al. | 99—96 |
| 3,257,289 | 6/1966 | Champagnat et al. | 195—3 |
| 3,264,196 | 8/1966 | Filosa | 195—82 |
| 3,271,266 | 9/1966 | Laine et al. | 195—3 |
| 3,308,035 | 3/1967 | Douros | 195—28 |
| 3,384,491 | 5/1968 | Guenther et al. | 99—9 |
| 3,355,296 | 11/1967 | Perkins et al. | 99—14 |

A. LOUIS MONACELL, Primary Examiner

J. L. WINDE, Assistant Examiner

U.S. Cl. X.R.

195—3, 111; 99—14; 195—311